(12) United States Patent
Frankel

(10) Patent No.: US 7,873,286 B2
(45) Date of Patent: Jan. 18, 2011

(54) OPTICAL RECEIVER SYSTEMS AND METHODS FOR POLARIZATION DEMULTIPLEXING, PMD COMPENSATION, AND DXPSK DEMODULATION

(75) Inventor: Michael Frankel, Linthicum, MD (US)

(73) Assignee: Ciena Corporation, Linthicum, MD (US)

( * ) Notice: Subject to any disclaimer, the term of this patent is extended or adjusted under 35 U.S.C. 154(b) by 676 days.

(21) Appl. No.: 11/875,794

(22) Filed: Oct. 19, 2007

(65) Prior Publication Data

US 2009/0103921 A1    Apr. 23, 2009

(51) Int. Cl.
    *H04B 10/06*    (2006.01)
(52) U.S. Cl. .................................................. 398/213
(58) Field of Classification Search ................ 398/152, 398/205–206, 212–213
    See application file for complete search history.

(56) References Cited

U.S. PATENT DOCUMENTS

| | | | |
|---|---|---|---|
| 4,691,984 A | 9/1987 | Thaniyavarn | |
| 4,856,093 A | * 8/1989 | Mohr | ......................... 398/204 |
| 5,013,116 A | 5/1991 | Yamazaki et al. | |
| 5,060,312 A | 10/1991 | Delavaux | |
| 5,793,511 A | 8/1998 | Buelow | |
| 2003/0020985 A1 | 1/2003 | LaGasse et al. | |
| 2003/0184735 A1 | 10/2003 | Kotten et al. | |
| 2004/0016874 A1 | 1/2004 | Rao et al. | |
| 2005/0117915 A1 | 6/2005 | Miyazaki | |
| 2007/0065157 A1 | 3/2007 | Katagiri et al. | |
| 2007/0166046 A1 | 7/2007 | Hecker et al. | |

FOREIGN PATENT DOCUMENTS

| WO | WO 02/35743 A2 | 5/2002 |
|---|---|---|
| WO | 2005086391 A1 | 9/2005 |

OTHER PUBLICATIONS

Mario Martinelli et al; "Polarization Stabilization in Optical Communications Systems"; Journal of Lightwave Technology, IEEE Service Center, New York, NY, US; vol. 24, No. 11, Nov. 1, 2006, pp. 4172-4183 XP011142887; ISSN: 0733-8724.

Fred Heismann, Member, IEEE; Analysis of a Reset-Free Polarization Controller for Fast Automatic Polarization Stabilization in Fiber-optic Transmission Systems; Manuscript received Jul. 18, 1993, IEEE Log No. 9216771; 0733-8724/94$04.00 (c) 1994 IEEE.

(Continued)

*Primary Examiner*—Leslie Pascal
(74) *Attorney, Agent, or Firm*—Clements Bernard PLLC; Christopher L. Bernard; Tyler S. Brown

(57) ABSTRACT

A simplified optical receiver architecture capable of tracking and demultiplexing polarization-multiplexed signals, dynamically compensating for PMD using a variety of polarization controller technologies, and reducing the number of delay line demodulators by two for both DPSK and DQPSK modulation is illustrated. Once polarization is stabilized at the first stage of the cascaded system of the present invention, subsequent stages can be simplified and cost reduced.

9 Claims, 6 Drawing Sheets

OTHER PUBLICATIONS

David Sandel, Reinhold Noe; Truly Endless Polarization Control With I&Q Mode Converters in X-Cut, Y-Propagation Lithium Niobate; University Paderborn, Germany, Jun. 2004.

Steve Yao, General Photonics Corp.; Polarization in Fiber Systems Squeezing Out more Bandwidth; Reprinted from the 2003 Issue of the Photonics Handbook(R), Laurin Publishing.

Marco Secondini; Optical Equalization: System Modeling and Performance Evaluation; Journal of Lightwave Technology, vol. 24, No. 11, Nov. 2006 IEEE.

D. L. Peterson Jr., P. J. Leo, K. B. Rochford; Field measurements of state of polarization and PMD from a tier-1 carrier; Optics Express 10 613 (2002).

P. M. Krummrich and K. Kotten; Extremely fast (microsecond timescale) polarization changes in high speed long haul WDM transmission systems; Siemens AG, Information and Communication Networks, Munich, Germany, OFC 2004.

Lianshan Yan, C. Yeh, G. Yang, L. Lin, Z. Chen, Y. Q. Shi, Alan Eli Willner, X. Steve Yao; Programmable Group-Delay Module Using Binary Polarization Switching; Journal of Lightwave Technology, vol. 21, No. 7, Jul. 2003.

* cited by examiner

OPTICAL RECEIVER SYSTEMS AND METHODS FOR POLARIZATION DEMULTIPLEXING, PMD COMPENSATION, AND DXPSK DEMODULATION

FIELD OF THE INVENTION

The present invention relates generally to optical receivers, and more particularly, to systems and methods for a simplified optical receiver architecture capable of tracking and demultiplexing polarization-multiplexed signals, dynamically compensating for Polarization Mode Dispersion (PMD) using a variety of polarization controller technologies, and reducing the number of delay line demodulators by two for both Differential Phase Shift Keying (DPSK) and Differential Quadrature Phase Shift Keying (DQPSK) modulation.

BACKGROUND OF THE INVENTION

Conventional fiber optic communication systems are well-developed for transmitting high-data rate signals, such as 10 Gbps and 40 Gbps signals. However, these high data rates are being pushed towards ever increasing speeds due to rapid growth in networks. For example, current standards bodies (e.g., IEEE) are considering data rates of 100 Gbps, which would require ever higher transmission rates (i.e., approximately 112 Gbps), once forward error correction (FEC) and framing (e.g., G.709) overheads are considered. Other standards bodies, such as ITU-T, are considering data rates of 120 Gbps, again requiring even higher transmission rates (i.e., approximately 130 Gbps). Such high data rates are beyond the limit of conventional electronics and optics. For example, conventional systems utilize a direct binary modulation scheme. Disadvantageously, direct binary modulation schemes have poor spectral efficiency which limits overall transmission system utilization in wavelength division multiplexed (WDM) systems.

One method for improving spectral efficiency and reducing the demands on system electronics and optics is to use both orthogonal polarizations of optical signals in single-mode fibers (SMFs), i.e., polarization multiplexing (PolMux). This effectively reduces the signal baud rate by a factor of two by transmitting two data streams on the same carrier signal. Signal transmission properties can also be improved by using Differential Phase Shift Keying (DPSK), which provides both enhanced tolerance to optical amplified spontaneous emission (ASE) noise, and an enhanced tolerance to deleterious fiber non-linear effects.

A further improvement in spectral efficiency, while preserving other advantages, can be achieved using Differential Quadrature Phase Shift Keying (DQPSK) transmission. At the same time, tolerance to chromatic dispersion (CD) is increased and the baud rate of the signal is also decreased (but not the bit rate). For example, a 112 Gbps signal can be transmitted using PolMux and DQPSK encoding as a 28 GBaud signal, correspondingly requiring electronic and optical components that need to support only a 28 Gbps bit rate. Advantageously, this allows for high-data rate signal transmission exceeding the limitations of conventional direct binary modulation schemes.

Of note, polarization multiplexed systems require a receiver architecture configured to perform polarization demultiplexing and polarization mode dispersion (PMD) mitigation. PMD is a generally deleterious effect experienced by high-bit rate optical signals as they propagate in fibers. It is related to a deviation in fiber geometry away from an ideal perfectly circular symmetry. The optical signal is correspondingly split into two polarization modes (Principal States of Polarization—PSP), which propagate with different speeds, i.e., the fiber becomes birefringent and looks like a very large collection of waveplates, due to the fiber geometry.

At some point, there is sufficient delay that accumulates between the modes such that the signal arriving at the receiver looks like two streams with different arrival times. The received signal experiences dual-path interference. The delay is independent of the signal data rate, and is an intrinsic property of the fiber optic link. However, the impairment experienced by the data signal is proportional to the bit rate, as the bit period is shortened. PMD poses a particular problem with polarization multiplexing as data is carried on orthogonal polarizations, and PMD destroys the orthogonality and induces polarization cross-talk. Accordingly, PMD mitigation is a required component in high-speed receiver architectures for polarization multiplexing.

Referring to FIG. 1, the current state of the art for a polarization multiplexed/DxPSK receiver system 10 uses separate building blocks 12,14,16 for the functions required to implement PMD mitigation 12, polarization demultiplexing 14,16, and DPSK/DQPSK (collectively referred to as "DxPSK") signal demodulation and balanced detection 22,24,26,28. Disadvantageously, conventional transmission schemes have increased complexity associated with receiver design. For example, an input 28 includes an optical signal with two polarizations. The input 28 is connected to a PMD compensator 12 shared for both polarization states. A controller 18 is utilized to provide feedback and control between the PMD compensator 12 and a polarization controller (PC) 14.

In particular, the system 10 is required to separate orthogonal polarizations with a high degree of polarization cross-talk rejection at a polarization beam splitter (PBS) 16. Also, PMD tolerance is degraded as it destroys orthogonality between polarizations. Finally, DxPSK modulation requires a separate Delay Demodulator 20,22 for each Quadrature and polarization (i.e., two for DPSK and four for DQPSK), which correspondingly increases system cost. Treating each stage as an independent PMD Compensator, followed by PM demultiplexing, followed by DxPSK demodulation is rather expensive, inefficient, and would require faster control loops at each stage.

Thus, it would be highly advantageous to provide a receiver scheme that can achieve PMD mitigation, polarization demultiplexing, and DxPSK signal demodulation and balanced detection in a single system with a reduced part count.

BRIEF SUMMARY OF THE INVENTION

In various exemplary embodiments, the present invention provides a simplified optical receiver architecture capable of tracking and demultiplexing polarization-multiplexed signals, dynamically compensating for PMD using a variety of polarization controller technologies, and reducing the number of delay line demodulators by two for both DPSK and DQPSK modulation. Once polarization is controlled at the first stage of the cascaded system of the present invention, subsequent stages can be simplified and cost reduced. This approach requires careful consideration of polarization through the complete receiver optical chain.

In an exemplary embodiment of the present invention, an optical receiver system includes a polarization demultiplexing and polarization mode dispersion mitigation section, a first polarization beam splitter receiving an output from the polarization demultiplexing and polarization mode dispersion mitigation section, and a demodulator. The polarization demultiplexing and polarization mode dispersion mitigation section includes a polarization controller connected to a first birefringent element, the first birefringement element connected to a first single-stage waveplate, and a control processor configured to control the polarization controller and the first single-stage waveplate responsive to a feedback signal. The demodulator includes a second birefringent element receiving a first polarization from the first polarization beam splitter, a second polarization beam splitter connected to the second birefringent element, a first set of photo-detectors receiving outputs from the second polarization beam splitter, a third birefringent element receiving a second polarization from the first polarization beam splitter, a third polarization beam splitter connected to the third birefringent element, and a second set of photo-detectors receiving the outputs from third polarization beam splitter. Optionally, the optical receiver system further includes a second birefringent element connected to the first single-stage waveplate, and the second birefringent element connected to a second single-stage waveplate, wherein the control processor is further configured to control the second single-stage waveplate. The first, second, and third birefringent elements include one of stabilized polarization maintaining fiber, a birefringent crystal element, and a polarization separated diverse path element. The stabilized polarization maintaining fiber includes active thermal stabilization.

The optical receiver system further includes a coupler located after the first polarization beam splitter operable to provide a signal tap, and a signal detector configured to receive the signal tap and generate the feedback signal for the control processor to mitigate polarization mode dispersion. The polarization controller, the first birefringent element, and the first single-stage waveplate are configured to create two orthogonal polarization propagation modes with negligible coupling between modes. Each of the second and third birefringent elements are configured to provide a one bit delay, and wherein the demodulator further includes splices between each of the second and third birefringent elements. The polarization demultiplexing and polarization mode dispersion mitigation section is configured to stabilize polarization and mitigate polarization mode dispersion simultaneously. The optical receiver system further includes an incoming optical signal to the polarization demultiplexing and polarization mode dispersion mitigation section, wherein the incoming optical signal includes polarization multiplexing and one of Differential Phase Shift Keying and Differential Quadrature Phase Shift Keying.

In another exemplary embodiment of the present invention, an optical receiver system with a double-pass architecture processing both polarizations in a demodulator includes a polarization demultiplexing and polarization mode dispersion mitigation section and a demodulator. The polarization demultiplexing and polarization mode dispersion mitigation section includes a polarization controller connected to a first port of a circulator, a first birefringent element connected to a second port of the circulator, a first single-stage waveplate connected to the first birefringent element, a second birefringent element connected to the first single-stage waveplate, a mirror connected to the second birefringent element, and a control processor configured to control the polarization controller and the first single-stage waveplate responsive to a feedback signal, wherein the circulator and mirror are operable to form the double pass architecture. The demodulator includes a delay interferometer receiving an output at a third port of the circulator, first and second polarization beam splitters each receiving an output from the delay interferometer, wherein the delay interferometer is configured to send a first and second polarization to both the first and second polarization beam splitters, a first set of photo-detectors receiving the first polarization from each of the first and second polarization beam splitters, and a second set of photo-detectors receiving the second polarization from each of the first and second polarization beam splitters. Optionally, the optical receiver system further includes a second single-stage waveplate connected between the third port of the circulator and the delay interferometer, wherein the control processor is further configured to control the second single-stage waveplate. The first and second birefringent elements include one of stabilized polarization maintaining fiber, a birefringent crystal element, and a polarization separated diverse path element. The stabilized polarization maintaining fiber includes active thermal stabilization.

Alternatively, the demodulator is a first demodulator, the output from the third port of the circulator is split, and the optical receiver system further includes a second demodulator. The second demodulator includes a second delay interferometer receiving the split output from the third port of the circulator, third and fourth polarization beam splitters each receiving an output from the second delay interferometer, wherein the second delay interferometer is configured to send the first and second polarization to both the third and fourth polarization beam splitters, a third set of photo-detectors receiving the first polarization from each of the third and fourth polarization beam splitters, and a fourth set of photo-detectors receiving the second polarization from each of the third and fourth polarization beam splitters. The polarization controller, the first and second birefringent elements, and the first single-stage waveplate are configured to create two orthogonal polarization propagation modes with negligible coupling between modes, and the polarization demultiplexing and polarization mode dispersion mitigation section is configured to stabilize polarization and mitigate polarization mode dispersion simultaneously.

In yet another exemplary embodiment of the present invention, an optical receiver system with a double-pass architecture separately processing both polarizations in a demodulator includes a polarization demultiplexing and polarization mode dispersion mitigation section, a first polarization beam splitter receiving an output from a third port of the circulator, the first polarization beam splitter operable to separate a first and second polarization, and a demodulator. The a polarization demultiplexing and polarization mode dispersion mitigation section includes a polarization controller connected to a first port of a circulator, a first birefringent element connected to a second port of the circulator, a first single-stage waveplate connected to the first birefringent element, a second birefringent element connected to the first single-stage waveplate, a mirror connected to the second birefringent element, and a control processor configured to control the polarization controller and the first single-stage waveplate responsive to a feedback signal, wherein the circulator and mirror are operable to form the double pass architecture. The demodulator includes a first delay interferometer receiving the first polarization from the first polarization beam splitter, the first delay interferometer including a birefringent waveplate, second and third polarization beam splitters each receiving an output from the first delay interferometer, a first set of photo-detectors receiving an in-phase component of the first polarization from each of the second and third polarization beam splitters, and a second set of photo-detectors receiving a quadrature component of the first polarization from each of the second and third polarization beam splitters. The demodulator further includes a second delay interferometer receiving the second polarization from the first polarization beam splitter, the second delay interferometer including a birefringent waveplate, fourth and fifth polarization beam splitters each receiving an output from the second delay interferometer, a third set of photo-detectors receiving an in-phase component of the second polarization from each of the fourth and fifth polarization beam splitters, and a fourth set of photo-detectors receiving a quadrature component of the second polarization from each of the fourth and fifth polarization beam splitters.

Optionally, the optical receiver system further includes a second single-stage waveplate connected between the third port of the circulator and the first polarization beam splitter, wherein the control processor is further configured to control the second single-stage waveplate. The first and second birefringent elements include one of stabilized polarization maintaining fiber, a birefringent crystal element, and a polarization separated diverse path element. The stabilized polarization maintaining fiber includes active thermal stabilization. The polarization controller, the first and second birefringent elements, and the first single-stage waveplate are configured to create two orthogonal polarization propagation modes with negligible coupling between modes, and the polarization demultiplexing and polarization mode dispersion mitigation section is configured to stabilize polarization and mitigate polarization mode dispersion simultaneously.

BRIEF DESCRIPTION OF THE DRAWINGS

The present invention is illustrated and described herein with reference to the various drawings, in which like reference numbers are used to denote like system components, as appropriate, and in which.

DETAILED DESCRIPTION OF THE INVENTION

In various exemplary embodiments, the present invention provides a simplified optical receiver architecture capable of tracking and demultiplexing polarization-multiplexed signals, dynamically compensating for PMD using a variety of polarization controller technologies, and reducing the number of delay line demodulators by two for both DPSK and DQPSK modulation. Once polarization is stabilized at the first stage of the cascaded system of the present invention, subsequent stages can be simplified and cost reduced.

The present invention simplifies polarization maintaining fiber (PMF) sections such that phase variations stay well within a single $2\pi$ period. Thus, the present invention only requires a single, fully-arbitrary polarization controller, and subsequent controllers can be implemented as single-stage adjustable waveplates with a well-defined axis orientation. Alternatively, the present invention contemplates using crystal-based differential polarization delays or the like instead of PMF sections.

Figure 1:
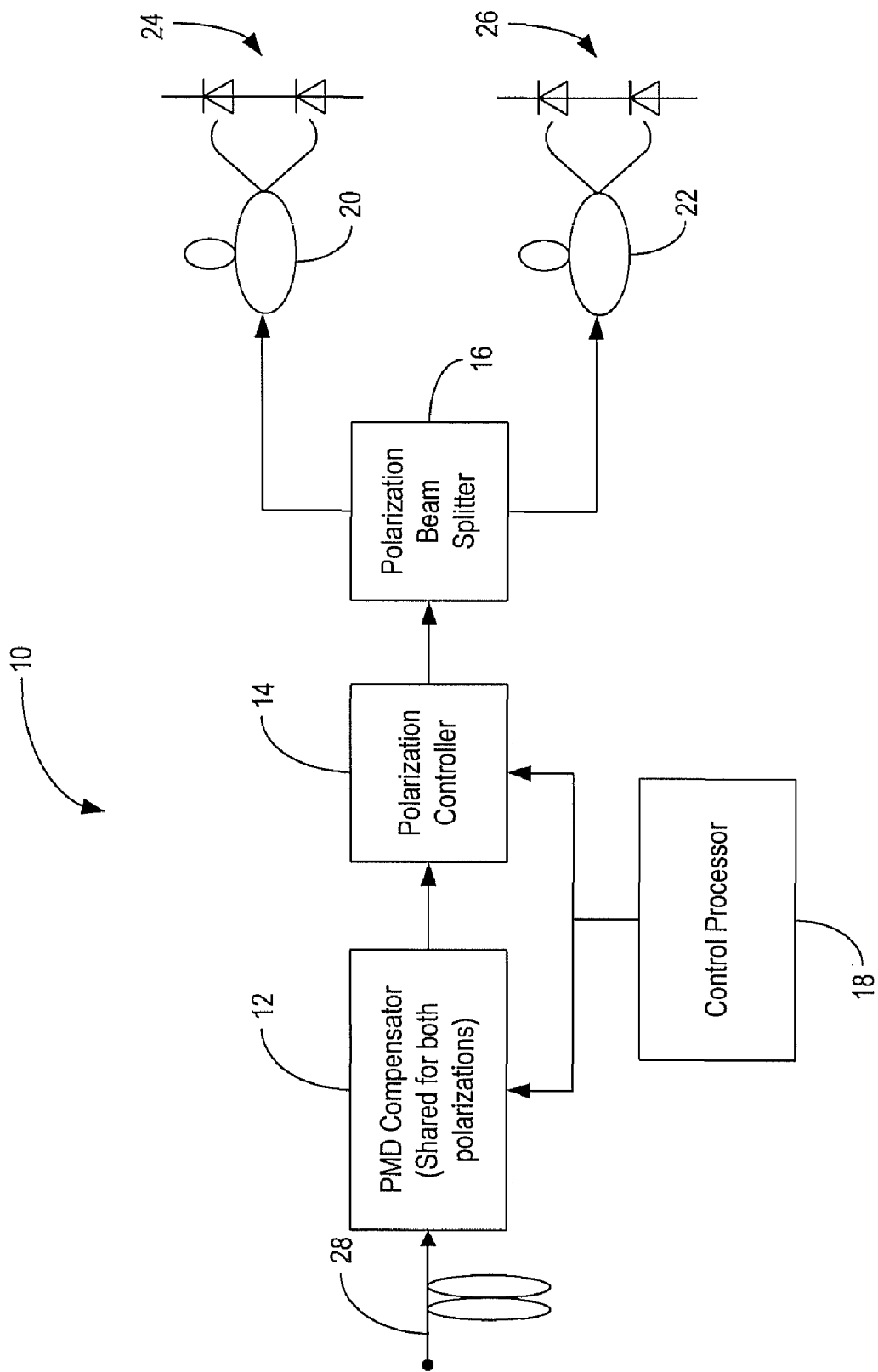
FIG. 1 is a block diagram of a conventional receiver system using separate building blocks for the functions required to implement PMD mitigation, polarization demultiplexing and DPSK/DQPSK signal demodulation and balanced detection.
Figure 2:
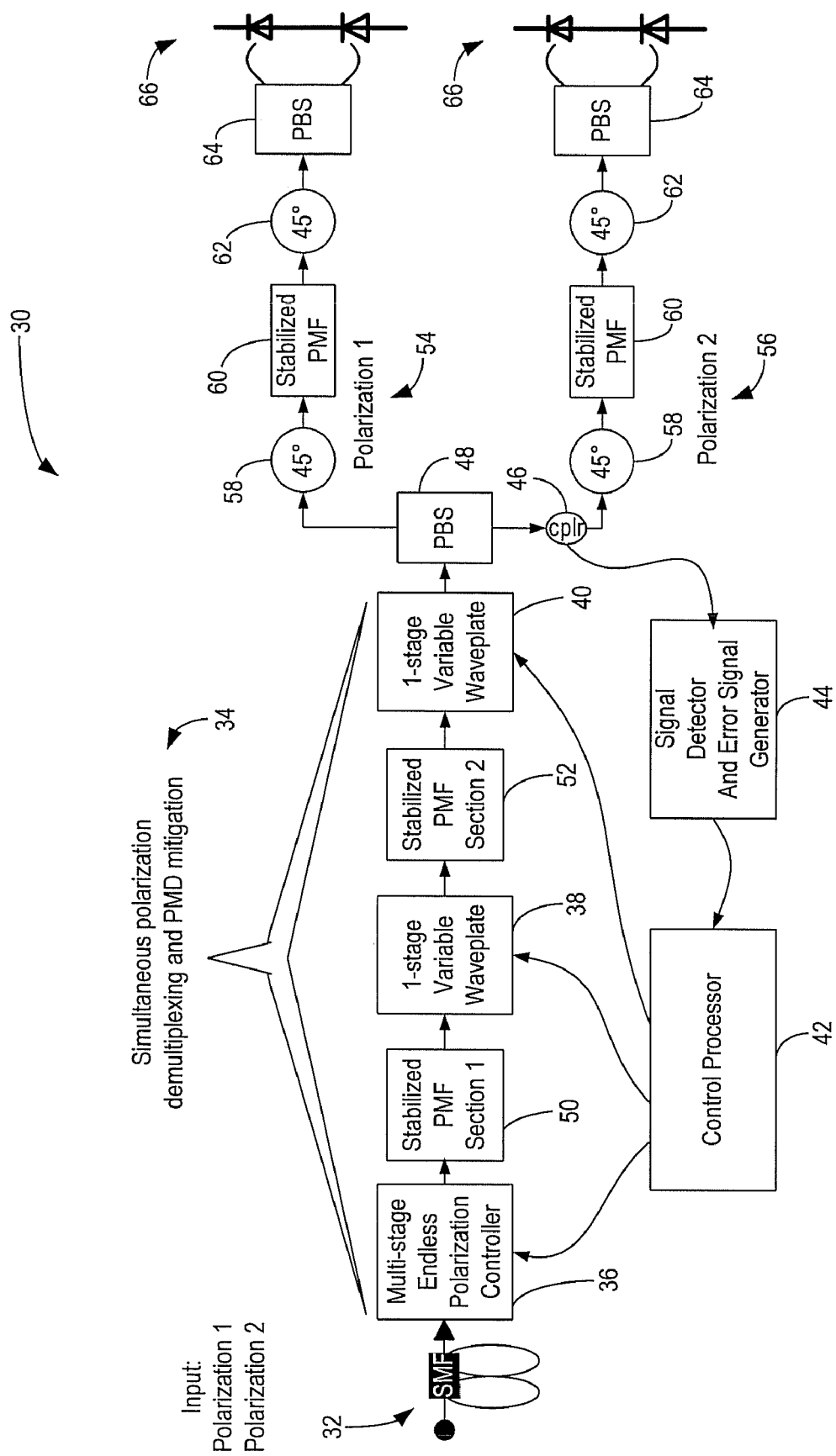
FIG. 2 is a block diagram of an optical receiver system according to an exemplary embodiment of the present invention.

Referring to FIG. 2, an optical receiver system 30 is illustrated according to an exemplary embodiment of the present invention. The receiver system 30 receives an input 32, such as from single mode fiber (SMF), and the input 32 includes an optical signal with two polarization states. The receiver system 30 is a cascaded system providing polarization demultiplexing, PMD mitigation, and DxPSK demodulation. In a first stage 34, the system 30 performs simultaneous polarization demultiplexing and PMD mitigation. Advantageously, once polarization is stabilized in the first stage 34, subsequent stages are simplified and cost reduced.

The present invention combines these functions and continually monitors polarization through the optical receiver system 30. By combining these functions, the receiver system 30 reduces control loop complexity relative to conventional designs. Additionally, the present invention can utilize a variety of polarization controller technologies reducing cost and increasing tracking and compensation bandwidth. Further, the present invention reduces the number of delay line demodulators by two for both DPSK and DQPSK modulation.

In the first stage 34, the input 32 is connected to a Multi-Stage Endless Polarization Controller (PC) 36. The PC 36 is configured to compensate for polarization fluctuations to provide a stable state of polarization (SOP). The basic building block of the PC 36 is an optical waveplate. The waveplate separates the incoming optical signal into two orthogonal polarizations (i.e., vertical and horizontal), and imposes a relative optical phase shift. For example, a $\lambda/2$ waveplate oriented at $X°$ to the incoming linear polarization rotates it by $2X°$, e.g., a $45°$ oriented $\lambda/2$ plate rotates the signal by $90°$. In another example, a $\lambda/4$ waveplate at $45°$ transforms a linear polarization to circular.

Generally, PCs 36 are implemented as a collection of cascaded waveplates which are controlled by an external parameter, such as feedback from a control processor 42. Each waveplate in the PC 36 can have two control parameters, i.e. its axis of orientation and its relative phase delay order. Some polarization control methods control both parameters and some only one with corresponding trade-offs. The present invention contemplates any polarization control method. In this exemplary embodiment, the waveplates 36 include cascaded rotating waveplates implemented in X-cut Z-propagating LiNbO3 material, or in X-cut Y-propagating LiNbO3 material.

The first stage 34 also includes additional waveplates 38,40 which are single-stage variable waveplates. The present invention stabilizes the incoming optical signal in the first stage 34 such that phase variations stay within a single $2\pi$ period. Accordingly, the optical receiver system 30 only requires a single fully-arbitrary PC, such as the PC 36. Subsequent control is implemented as the single-stage waveplates 38,40.

The control processor 42 is configured to control the PC 36 and waveplates 38,40 responsive to an error signal received from a signal detector and error signal generator 44. The detector/generator 44 is configured to receive an optical tap from a coupler 46 which taps a portion of the optical signal after a polarization beam splitter (PBS) 48 has separated the polarizations. The detector/generator 44 measures the fluctuations in the optical signal's polarization and inter-polarization crosstalk and provides a feedback signal in the form of an error signal to the control processor 42 which in turn controls the PC 36 and waveplates 38,40.

The control processor 42, PC 36, and waveplates 38,40 are operable to mitigate PMD. The optical signal separates into two polarization modes, i.e. principle states of polarization (PSP), which propagate with different speeds, i.e. the fiber becomes birefringent and looks like a very large collection of waveplates. At some point, there is sufficient delay caused by PMD that accumulates between the modes such that the signal arriving at the input 32 looks like two streams with different arrival times. This delay is independent of the signal data rate, and is an intrinsic property of fiber.

The first stage 34 stabilizes the incoming polarization, i.e., the vertical and horizontal components, in the receiver system 30 and introduces a relative delay that is approximately equal to the delay accumulated in the fiber. But the relative sign of the delay is reversed such that a component that was delayed in the transmission fiber is advanced in the compensation section. The delay element can be some form of physical path difference, such as a highly birefringent crystal or highly birefringent fiber such as polarization maintaining fiber 50,52. The waveplates 36,38 serve to align appropriate optical signal component to either slow or fast axis of the birefringent element, such that a relative time delay is induced between the optical signal components by the birefringent element (i.e., PMF, crystal, diverse path, etc.).

In this exemplary embodiment, the PC 36 and waveplates 38,40 are connected through two sections of stabilized polarization maintaining fiber (PMF) 50,52. PMF 50,52 uses a purposely induced stress or ellipticity around the core to induce a strong directional difference in the optical index of refraction. Thus, two orthogonal polarization propagation modes are created with negligible coupling between them. This difference in the index of refraction creates different mode group velocity, and typical commercial fibers exhibit mode differential delay of approximately 1 ps per 0.6 m. Thus, a half-bit delay for a 28 Gbps signal would require approximately 71.3 ps delay which is approximately 43 m of PMF 50,52. The PMF 50,52 mitigates PMD by introducing relative delay in this stage 34. In alternative exemplary embodiments, the PC 36 and waveplates 38,40 can be connected through birefringent crystal elements, polarization separated diverse path elements, and the like.

Figure 3:
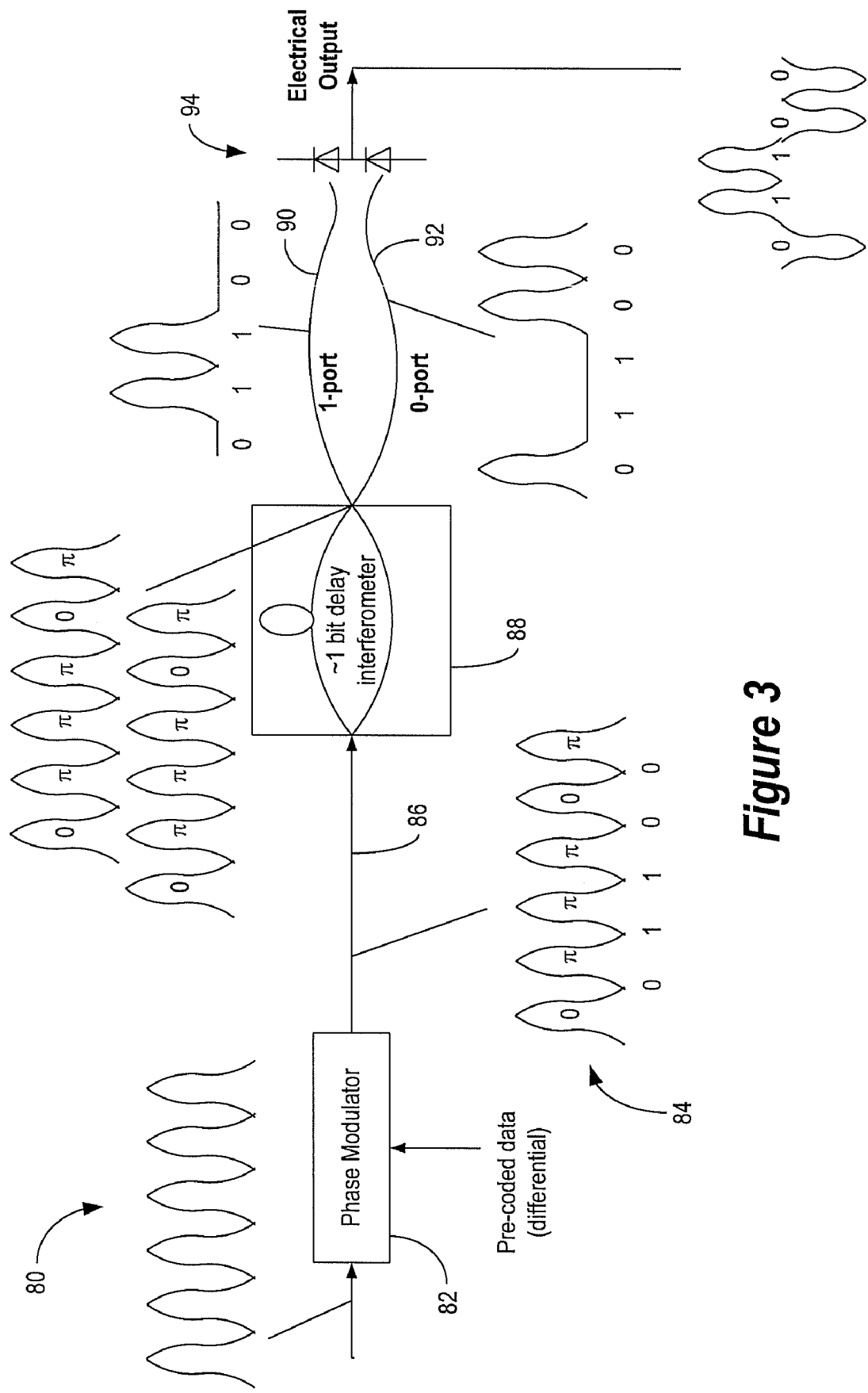
FIG. 3 is a diagram illustrating an exemplary embodiment of DPSK with Return-to-Zero (RZ) pulses.

After the first stage 34, the optical signal is input into the PBS 48 which simply separates the orthogonal polarizations of the optical signal. Following the PBS 48, the optical signal is split into two polarizations 54,56 and sent on separate paths for DxPSK demodulation. DPSK and DQPSK schemes fall into a general class of phase modulation. These are detected by a self-homodyne differential principal. Referring to FIG. 3, an exemplary embodiment of DPSK with RZ pulses is illustrated. Note, DPSK and DQPSK can also be utilized with non-return to zero (NRZ) pulses as well. First, RZ pulses 80 are input into a phase modulator 82 which using pre-coded data performs phase modulation to output a DPSK phase modulated RZ data stream 84.

The transmitted data in the data stream 84 is encoded as a differential phase shift of $\pi$. For example, if a "0" is sent, then a phase shift is made of $\pi$ or $-\pi$, and if a "1" is sent, the phase is kept the same. The data stream 84 is transmitted over a path 86, such as optical fiber. At a receiver 88, two copies are made of the optical signal and one copy is delayed by one bit period with a delay interferometer. A comparison is done at the output of the interferometer. If the phases are the same, constructive interference produces a pulse on a "1" port 90, and if the phases are inverted, constructive interference produces a pulse on a "0" port 92. Both of these pulses on the ports 90,92 are electrically observed with photo-detectors 94 and subtracted. Thus, "1" is observed as a + pulse, and "0" observed as a − pulse on a conventional electrical data recovery circuit. DQPSK is similar, but the phase shift increment is $\pi/2$.

Referring back to FIG. 2, in an exemplary embodiment of the present invention, the two polarizations 54,56 each go through a 45° splice 58 followed by a section of stabilized PMF fiber 60. The 45° splice 58 splits optical signal equally between slow and fast axes of the PMF fiber 60, which is in turn used to induce a relative one bit delay required for the demodulation. After the PMF fiber 60, the signals are processed by a PBS 64 with its axes oriented at 45° relative to the PMF fiber. Hence, fast and slow optical components for optical interference, and produce an in-phase output to the "1" port of PBS 90 or out-of-phase output to "0" port of PBS 90. This operation is functionally identical to that of Delay Interferometer 88 of FIG. 3.

The performance of the optical receiver system 30 is governed by the PC 36, the number of waveplates 38,40, and PMF sections 50,52 in the first stage 34. The exemplary embodiment of FIG. 2 includes two sections. Other configurations can include additional waveplates and PMF sections, which has the effect of improving overall receiver performance and PMD compensation ability with a trade-off of increased cost and complexity.

Figure 4:
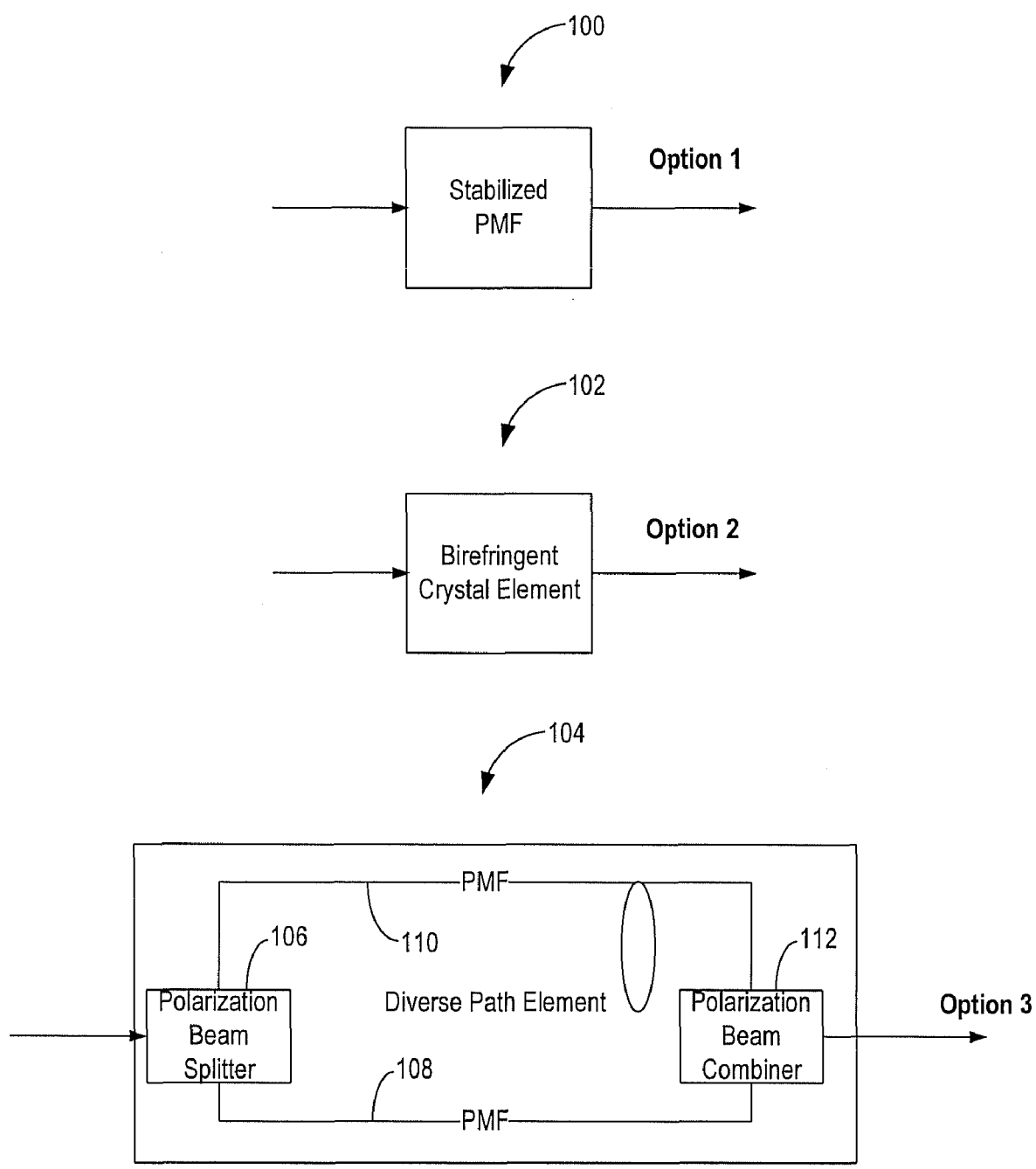
FIG. 4 is a diagram illustrating various exemplary embodiments of different relative delay elements which can be utilized in the first stage and in the DxPSK demodulator.

Referring to FIG. 4, in various exemplary embodiments of the present invention, different relative delay elements 100, 102,104 can be utilized as the birefringent element in the first stage and in the DxPSK demodulator. These various delay elements 100,102,104 are configured to provide fixed relative delays between orthogonal polarizations. In a first option, a stabilized PMF section 100 can be utilized for the delay element as illustrated in FIG. 2. PMF 100 is an optical fiber in which the polarization planes of light waves launched into the fiber are maintained during propagation with little or no cross-coupling of optical power between the polarization modes. Several different designs of PMF 100 are used, such as by inducing stress in the core via a non-circular cladding cross-section, or via rods of another material included within the cladding. Disadvantageously, PMF 100 is expensive and has higher attenuation than standard single mode fiber.

The present invention stabilizes PM fiber sections utilizing mechanisms that induce relative optical phase shifts between the two modes ("slow" and "fast") of the PM Fiber. Changes in temperature induce a change in glass material refractive index and produce thermal expansion. The index thermal coefficient (1/n dn/dT) is $\sim 8 \times 10^{-6}/°$ C., and the thermal expansion coefficient ($K_{exp}=1/l$ dl/dT) is $8 \times 10^{-7}/°$ C. However, the dominant mechanism in PM Fibers is thermally-induced change in birefringence. For example, calculations set this coefficient for a common PANDA-type fiber around $K_B \sim -1 \times 10^{-3}/°$ C., which is several orders of magnitude higher than thermal expansion (index change is already included into this effect). PM Fibers with reduced thermal dependence have been demonstrated, but have not yet seen wide commercial development.

The relative optical phase shift between the "slow" and "fast" modes of the PM fiber can be computed as follows:

$$\frac{d\Delta\phi}{dT} = \frac{2\pi L}{L_B}(K_{exp} + K_B),$$

where $L_B$ is the beat length of the PM fiber.

Assuming a typical parameter of $L_B \sim 3$ mm, and required PM Fiber length, the resulting phase shift is $$\frac{d\Delta\phi}{dT} = -44 \text{ rad/}^\circ \text{ C. for 21 m } PM \text{ fiber, and}$$

$$\frac{d\Delta\phi}{dT} = -25 \text{ rad/}^\circ \text{ C. for 12 m } PM \text{ fiber.}$$

With a typical industrial temperature variation range extending over ~50 degrees, the effective phase change will be ~2200 radians or ~350 full wave periods. Clearly, such huge thermal dependence requires active stabilization, and stabilization must be thermal. PM Fibers with reduced thermal dependence can be stabilized in other ways, such as, for example, with a mechanical stretcher mechanism.

The required thermal stability for PMD compensation section can be calculated by assuming that the present invention can tolerate at most a ±π/2 phase variation over temperature, and the required thermal control stability is in this case $\Delta T = \pm\pi/2/25 = 0.068^\circ$ C. This stability is quite achievable with today's thermal control state of the art, and further precision is achieved with the 1-stage variable waveplate following the PM section.

The required thermal stability for signal demodulator section can be calculated by assuming that the present invention can tolerate at most a ±π/60 phase variation over temperature, and the required thermal control stability is in this case $\Delta T = \pm\pi/60/44 = 0.0012^\circ$ C. This stability is challenging, and further improvement can be achieved by coupling to a fiber stretcher control.

The calculations and numbers provided herein are close to worst case specifications, i.e. assuming a specific PANDA-type fiber with extremely high thermal dependence. Other fiber types, such as air hole assisted PM fiber can have a factor of 10 smaller thermal dependence. Thus, all of the above stability requirements can be relaxed by ~10 times using these other fiber types.

In another exemplary embodiment, a birefringent crystal element 102 can be used as the delay element. The birefringent crystal element 102 provides a very stable and compact relative delay element, but requires a crystal with appropriate optical transmission at the wavelengths of interest, and requires careful fabrication, packaging, and fiber connectorization. Further, in yet another option, a diverse path element 104 can be utilized with a polarization beam splitter 106, two differing lengths of PMF 108,110, and a polarization beam combiner 112. This implementation avoids crystal transmission issues, but requires careful assembly of micro-optic elements with a precise relative delay control.

Figure 5:
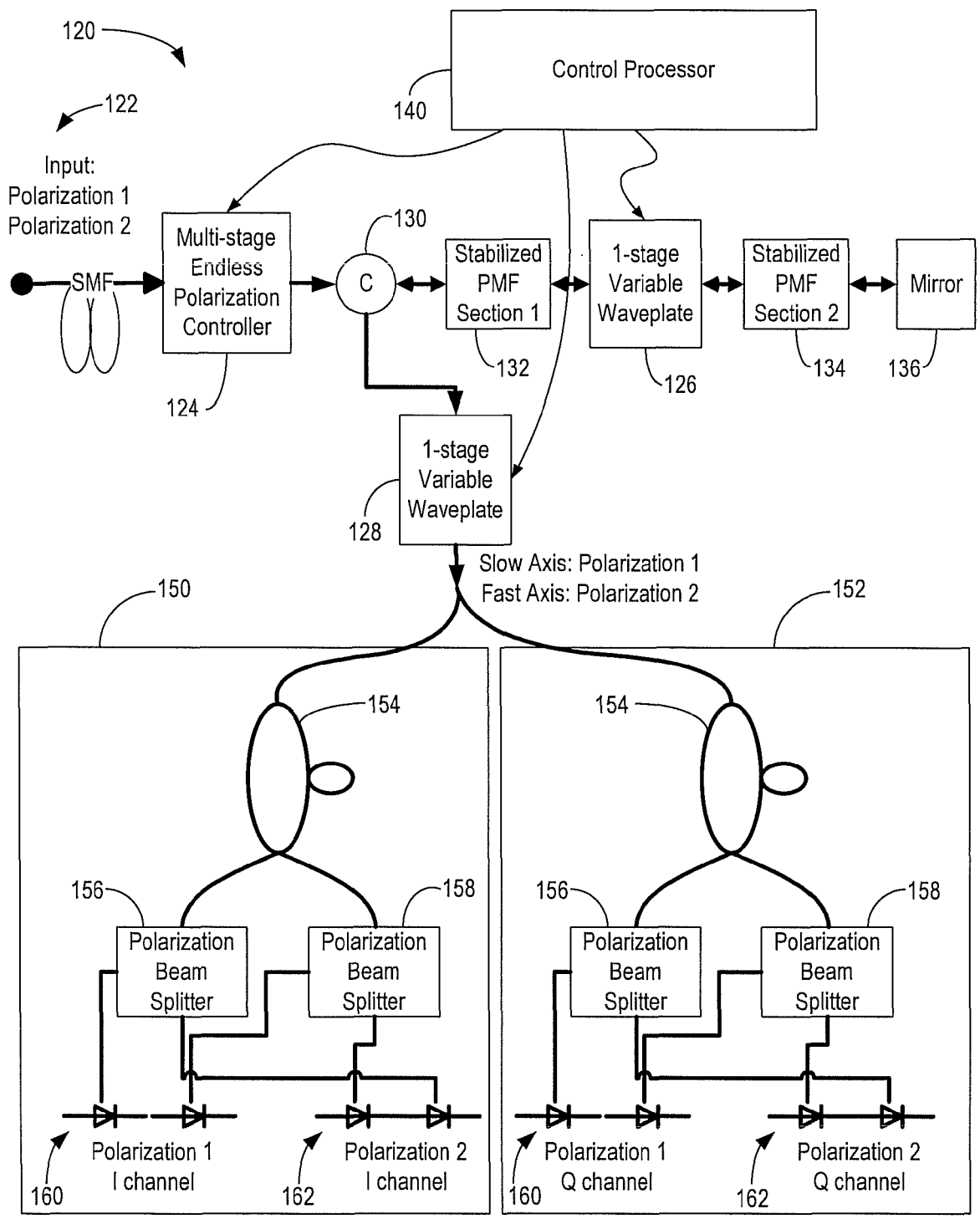
FIG. 5 is a block diagram illustrating an optical receiver system which provides an increase in the effective number of stages and reduces required PMF fiber use according to another exemplary embodiment of the present invention.

Referring to FIG. 5, in another exemplary embodiment of the present invention, an optical receiver system 120 provides an increase in the effective number of stages and reduces required PMF fiber use or other birefringement elements. The receiver system 120 provides a double-pass architecture as well as leverages the same delay interferometer to process both polarization signals for DPSK demodulation. Additionally, the receiver system 120 can be used for DQPSK detection, but substituting the DPSK delay demodulator with a DQPSK delay demodulator with four outputs.

An optical signal input 122 including two polarizations is input into a polarization controller 124. In this embodiment, the first stage for polarization demultiplexing and PMD mitigation includes a circulator 130, a first section of stabilized PMF 132, a second section of stabilized PMF 134, and a mirror 136. The circulator 130 and mirror 136 enable the double-pass architecture. A control processor 140 is configured to control the PC 124 and waveplates 126,128 to mitigate PMD dynamically and to assure subsequent polarization demultiplexing. Similar to FIG. 2, the optical receiver system 120 stabilizes the incoming optical signal in the first stage such that phase variations stay within a single 2π period. Accordingly, optical receiver system 120 only requires a single fully-arbitrary PC, such as the PC 124. Subsequent control is implemented as the single-stage waveplates 126, 128.

After the waveplate 128, the optical signal is separated into two polarizations, polarization 1 and 2 with polarization 1 on the slow axis and polarization 2 on the fast axis. These polarizations are provided to a demodulator 150 for DPSK demodulation. Optionally for DQPSK demodulation, a second demodulator 152 is included. The demodulator 150,152 is a demodulator with non-birefringent operation. A delay interferometer 154 is a non-birefringent element in this implementation, and it sends the polarizations 1 and 2 to two separate PBSs 156,158. Each PBS 156,158 separates the polarizations 1 and 2. The first PBS 156 provides separation on the optical signals corresponding to "1" data on both polarizations, and the second PBS 158 provides separation on the optical signals corresponding to "0" data on both polarizations. The outputs of the PBSs 156,158 are sent to photo-detectors 160,162 for detection. The demodulator 150 provides demodulation of an in-phase channel (I-channel) for DPSK and for DQPSK demodulation. The demodulator 152 provides demodulation of a quadrature channel (Q-channel) for DQPSK demodulation, and is not required for DPSK demodulation.

Figure 6:
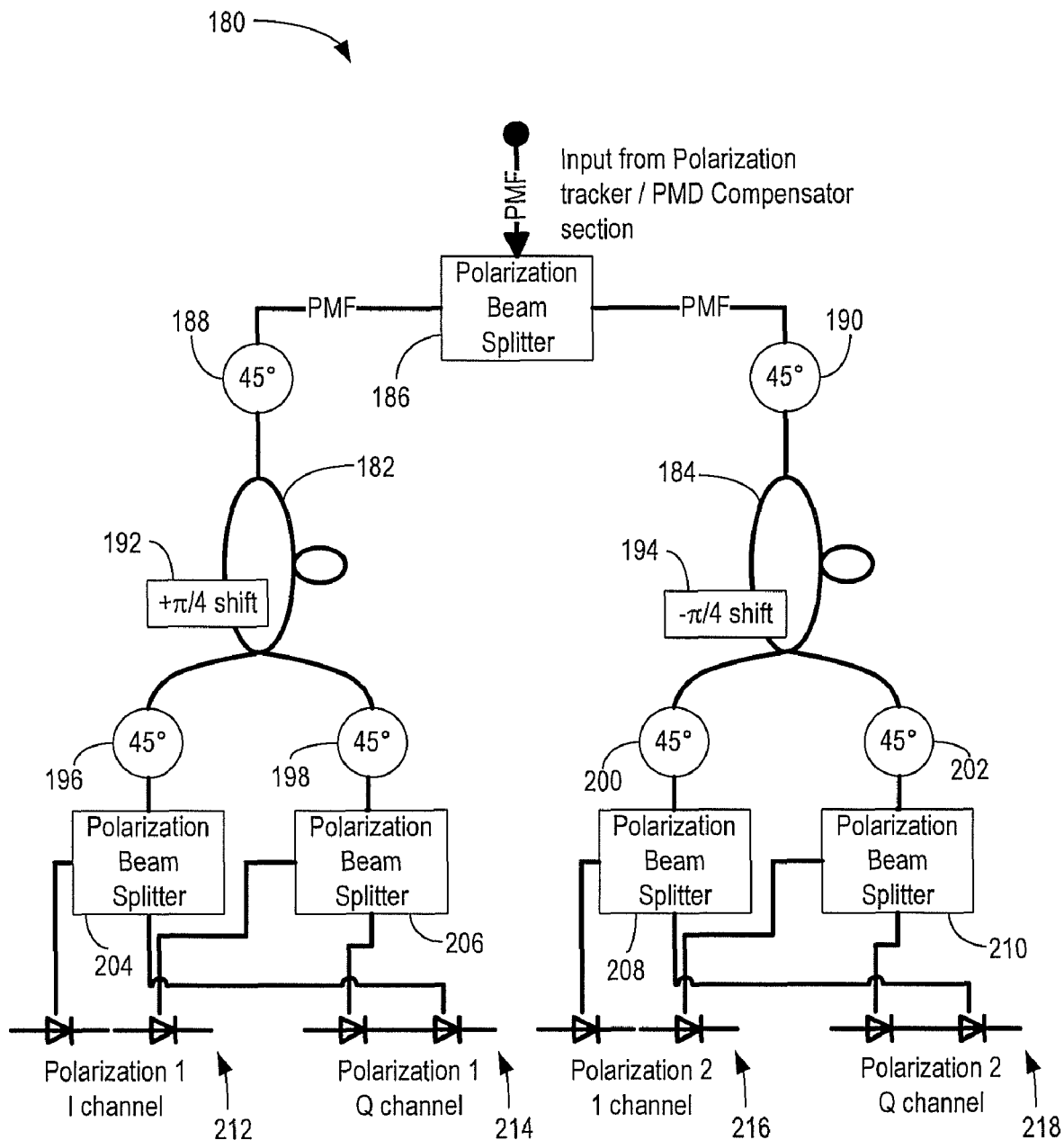
FIG. 6 is a block diagram illustrating another demodulator system for DQPSK demodulation with both the I and Q channels.

For DQPSK demodulation, the receiver system 120 uses two separate delay interferometers for the I and Q channels, but processes both polarizations within the same demodulator. Referring to FIG. 6, an alternative demodulator system 180 can be utilized with about the same general level of complexity, but with separate polarization signals prior to delay demodulators 182,184. Each delay demodulator 182, 184 applies to a single signal polarization, and uses its own internal polarization mode diversity to separately demodulate I and Q channels.

The demodulator system 180 utilizes the same polarization tracker/PMD compensation components (components 124-140) from the receiver system 120 in FIG. 5. In FIG. 6, the demodulator system 180 is illustrated for DQPSK demodulation with both the I and Q channels, and the system 180 could be utilized for DPSK demodulation without the Q channels. A polarization beam splitter 186 receives the optical signal from the Polarization tracker/PMD Compensator section. The polarization beam splitter 186 splits the polarizations, and sends them first to a 45° splice 188,190 and then to the delay demodulators 182,184.

The delay demodulators 182,184 each include a birefringent waveplate 192,194 to provide relative phase shift between polarizations. The delay demodulator 182 includes a +π/4 shift waveplate 192, and the delay demodulator 184 includes a −π/4 waveplate 194. The delay demodulators 182, 184 create a copy of the optical signal and delay the copy in order to provide interference to determine phase. After the delay demodulators 182,184, the original signal and the copy are separately first sent to a 45° splice 196,198,200,202, and then to a PBS 204,206,208,210.

The PBS 204,206 split the first polarization from the original signal and the copy, and provides the outputs to photo-detectors 212,214 for the I and Q channels of the first polarization. The PBS 208,210 split the second polarization from the original signal and the copy, and provides the outputs to photo-detectors 216,218 for the I and Q channels of the second polarization.

In the various exemplary embodiments of the present invention, the receiver system architecture provides tracking and demultiplexing of polarization multiplexed signals while dynamically compensating for PMD. The present invention can utilize a variety of polarization controller techniques as are known in the art which can reduce cost and increase tracking and compensation bandwidth. Further, the present invention reduces the number of delay line demodulators by two for both DPSK and DQPSK demodulation. The present invention combines the functions of polarization demultiplexing, PMD mitigation, and DxPSK demodulation rather than treating them as separate, independent blocks.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical receiver system, comprising:
   a polarization demultiplexing and polarization mode dispersion mitigation section, comprising:
      a polarization controller connected to a first birefringent element; the first birefringent element connected to a first single-stage waveplate; and
      a control processor configured to control the polarization controller and the first single-stage waveplate responsive to a feedback signal;
   a first polarization beam splitter receiving an output from the polarization demultiplexing and polarization mode dispersion mitigation section; and
   a demodulator, comprising:
      a second birefringent element receiving a first polarization from the first polarization beam splitter; a second polarization beam splitter connected to the second birefringent element; a first set of photo-detectors receiving outputs from the second polarization beam splitter; a third birefringent element receiving a second polarization from the first polarization beam splitter; a third polarization beam splitter connected to the third birefringent element; and a second set of photo-detectors receiving the outputs from third polarization beam splitter.

2. The optical receiver system of claim 1, further comprising a second birefringent element connected to the first single-stage waveplate, and the second birefringent element connected to a second single-stage waveplate;
   wherein the control processor is further configured to control the second single-stage waveplate.

3. The optical receiver system of claim 1, further comprising:
   a coupler located after the first polarization beam splitter operable to provide a signal tap; and
   a signal detector configured to receive the signal tap and generate the feedback signal for the control processor to mitigate polarization mode dispersion.

4. The optical receiver system of claim 1, wherein the polarization controller, the first birefringent element, and the first single-stage waveplate are configured to create two orthogonal polarization propagation modes with negligible coupling between modes.

5. The optical receiver system of claim 1, wherein each of the second and third birefringent elements are configured to provide a one bit delay, and wherein the demodulator further comprises splices between each of the second and third birefringent elements.

6. The optical receiver system of claim 1, wherein the polarization demultiplexing and polarization mode dispersion mitigation section is configured to stabilize polarization and mitigate polarization mode dispersion simultaneously.

7. The optical receiver system of claim 1, further comprising an incoming optical signal to the polarization demultiplexing and polarization mode dispersion mitigation section, wherein the incoming optical signal comprises polarization multiplexing and one of Differential Phase Shift Keying and Differential Quadrature Phase Shift Keying.

8. The optical receiver system of claim 1, wherein the first, second, and third birefringent elements comprise one of stabilized polarization maintaining fiber, a birefringent crystal element, and a polarization separated diverse path element.

9. The optical receiver system of claim 8, wherein the stabilized polarization maintaining fiber comprises active thermal stabilization.

* * * * *